3,299,108
17α - ALKYNYL/ALKENYL - 13β - ALKYL - 11 - AL-
KYLGONA - 1,3,5(10) - TRIENE - 3,17β - DIOLS,
ETHERS AND ESTERS THEREOF AND INTER-
MEDIATES THERETO
John S. Baran, Morton Grove, Ill., assignor to G. D.
Searle & Co., Chicago, Ill., a corporation of Delaware
No Drawing. Filed Oct. 18, 1965, Ser. No. 497,462
8 Claims. (Cl. 260—397.5)

The present invention is concerned with novel steroidal compounds characterized by an 11-alkyl substituent and, more particularly, with the 17α-alkynyl/alkenyl-13β-alkyl-11-alkylgona-1,3,5(10)-triene-3,17β-diols and the corresponding ethers and esters encompassed by the following structural formula

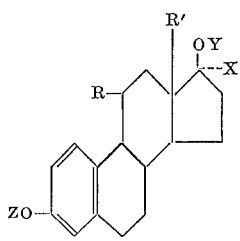

wherein R and R' are lower alkyl radicals, X is an unsaturated lower aliphatic hydrocarbon radical, Y is either hydrogen or a lower alkanoyl group and Z can be hydrogen, a lower alkanoyl or a lower alkyl radical.

The unsaturated lower aliphatic hydrocarbon radicals denoted by X in the foregoing structural representation are exemplified by lower alkynyl radicals such as ethynyl, propynyl, butynyl, pentynyl, hexynyl, heptynyl and the branched-chain groups isomeric therewith and lower alkenyl radicals such as vinyl, propenyl, butenyl, pentenyl, hexenyl, heptenyl and the branched-chain isomers thereof.

Typical of the lower alkyl radicals encompassed in the R, R' and Z terms are methyl, ethyl, propyl, butyl, pentyl, hexyl, heptyl and the branched-chain groups isomeric therewith. The lower alkanoyl groups, indicated by the Z term are formyl, acetyl, propionyl, butyryl, valeryl, caproyl, heptanoyl and the branched-chain isomers thereof.

The 13β-methyl compounds of the present invention are conveniently produced by utilizing as the starting material 3-(lower alkoxy)estra-1,3,5(10)-triene-11,17-dione 17-ethylene ketals, which are obtained from androsta-1,4-diene-3,11,17-trione by conversion of the latter substance to the 17-ethylene ketal by means of heating with ethylene glycol in the presence of p-toluenesulfonic acid, followed by reduction with lithium tri-(tertiary-butoxy) aluminum hydride to afford 11β-hydroxyandrosta-1,4-diene-3,17-dione 17-ethylene ketal, which is aromatized by heating with lithium, biphenyl and diphenylmethane in tetrahydrofuran to yield 3,11β-dihydroxyestra-1,3,5(10)-trien-17-one 17-ethylene ketal, which is alkylated with an alkyl hadile in the presence of a suitable acid acceptor to afford the corresponding 3-alkoxy compounds which are oxidized at the 11-position. Thus, 3,11β-dihydroxyestra-1,3,5(10)-trien-17-one 17-ethylene ketal is heated in methanol with methyl iodide and potassium carbonate to produce 11β-hydroxy-3-methoxy-estra-1,3,5(10)-trien-17-one 17-ethylene ketal, which is oxidized with chromic acid to afford the desired 3-methoxyestra-1,3,5(10)-triene-11,17-dione 17-ethylene ketal.

Reaction of the aforementioned starting materials with the appropriate alkyl organometallic reagent results in the corresponding 11-alkyl-11-hydroxy derivatives. Typically 3-methoxyestra-1,3,5(10)-triene-11,17-dione 17-ethylene ketal is allowed to react with methyl magnesium bromide in butyl ether to produce 11-hydroxy-3-methoxy-11-methylestra-1,3,5(10)-trien-17-one 17-ethylene ketal. Removal of the 11-hydroxy function is effected by reaction with a suitable dehydrating agent. When the latter compound, for example, is contacted with thionyl chloride in pyridine, 3-methoxy - 11 - methyl-estra-1,3,5(10),9(11)-tetraen-17-one 17-ethylene ketal is produced. Removal of the 17-ketal moiety is effected by heating with dilute hydrochloric acid in methanol, in the latter instance resulting in 3 - methoxy-11-methylestra-1,3,5(10),9(11)-tetraen-17-one. Reduction of those 9(11)- dehydro compounds to afford the corresponding 1,3,5(10)-trienes is conveniently effected by hydrogenation in the presence of a palladium catalyst. The latter 3-methoxy-11-methyl-estra-1,3,5(10),9(11)-tetraen-17-one is thus hydrogenated in the presence of a 10% palladium-on-carbon catalyst to yield a mixture of 3-mehtoxy-11β-methylestra-1,3,5(10)-trien-17-one and 3 - methoxy-11α-methyl-9β-estra-1,3,5(10)-trien-17-one. Alkynylation of the 17-keto group results in the instant 17α-alkynyl-17β-hydroxy derivatives. 3-methoxy-11β-methylestra-1,3,5(10)-trien-17-one is thus contacted with lithium acetylide, suitably in the form of an ethylene diamine complex to produce 17α-ethynyl-3-methoxy-11β-methylestra-1,3,5(10)-trien-17β-ol.

The 17-alkenyl compounds of the present invention are conveniently obtained by partial reduction of the corresponding 17-alkynyl substances. Typically, the aforementioned 17α-ethynyl-3-methoxy-11β-methylestra-1,3,5(10)-trien-17β-ol in pyridine solution is shaken with hydrogen at atmospheric pressure and room temperature in the presence of a 5% palladium-on-carbon catalyst to afford 3-methoxy-11β-17α-vinylestra-1,3,5(10)-trien-17β-ol.

An alternate process for manufacture of the instant compounds, wherein the 11-alkyl group contains more than one carbon atom, involves the reaction of an alkynyl or alkenyl organometallic reagent with the 11-keto group of the aforementioned starting materials. The reaction of lithium acetylide with 3-methoxyestra-1,3,5(10)-triene-11,17-dione 17-ethylene ketal thus affords 11-ethynyl-11-hydroxy-3-methoxyestra-1,3,5(10)-trien-17-one 17-ethylene ketal, which is reduced to the corresponding 11-ethyl compound by catalytic hydrogenation according to the procedures described hereinbefore. Dehydration of the latter substances followed by removal of the ketal function and reduction of the 9(11) double bond by the aforementioned processes, affords, in the latter case, 11β-ethyl-3-methoxyestra-1,3,5(10)-trien-17-one. That intermediate is alkynylated by methods described above to yield the corresponding instant 17-alkynyl-17-hydroxy substances.

A convenient procedure for manufacture of the esters of the present invention involves reaction of the corresponding hydroxy compounds with a lower alkanoic acid anhydride or halide, preferably in the presence of a suitable acid acceptor. Esterification of the 17-hydroxy group requires an elevated temperature while the 3-hydroxy group is converted at room temperature. Those processes are specifically exemplified by the reaction of 17a - ethynyl-3-methoxy-11β-methylestra-1,3,5(10)-trien-17β-ol with acetic anhydride and pyridine at 90–100° to yield 17a-ethynyl-3-methoxy-11β-methylestra-1,3,5(10)-trien-17β-ol 17-acetate and the reaction of those reagents with 17a-ethynyl-11β-methylestra-1,3,5(10)-triene-3,17β-diol at room temperature to yield the corresponding 3-monoacetate.

The compounds of this invention wherein the 13-alkyl group contains more than one carbon atom are obtained by a process utilizing 13-alkylgona-1,3,5(10)-9(11)-tetraene-3,17β-diol 3-alkyl ethers as starting materials. dl-13β-ethylgona-1,3,5(10),9(11)-tetraen-3,17β-diol 3-methyl ether, for example, is oxidized, suitably with m-chloroperbenozic acid, to afford dl-17β-hydroxy-13β-methyl-3-methoxygona-1,3,5(10)-trien-11-one. Addition of methyl magnesium bromide to the latter substance followed by oxidation and dehydration of the resulting 11-methyl-11-hydroxy compound, reduction of the thus produced 9(11) double bond and ethynylation of the 17-keto group by the methods described hereinbefore thus affords dl-13β-ethyl-17α - ethynyl-11β-methylgona-1,3,5(10)-triene-3,17β-diol 3-methyl ether. Resolution of these dl compounds to afford the individual d and l enantiomorphs is conveniently effected by esterification of an hydroxy group with a dibasic acid anhydride such as succinic or phthalic anhydride to afford the corresponding acid ester which is resolved by means of an optically active amine such as brucine, morphine, quinine, quinidine, strychnine, etc.

The compounds of this invention display valuable pharmacological properties. They are hormonal agents, for example, as is evidenced by their estrogenic and deciduogenic properties. The instant 11-alkyl-17-keto intermediates are useful additionally in view of their estrogenic and hypocholesterolemic activity.

The invention will appear more fully from these examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight unless otherwise noted.

*Example 1*

A mixture of 23 parts of androsta-1,4-diene-3,11,17-trione, approximately 17 parts of ethylene glycol, 2 parts of p-toluenesulfonic acid monohydrate and 1800 parts of benzene is heated at the reflux temperature with stirring for about 2 hours, during which time the water of reaction is continuously removed. The reaction mixture is then cooled, washed successively with aqueous sodium carbonate and water, dried over anhydrous magnesium sulfate and stripped of solvent by distillation under reduced pressure. Trituration of the resulting residue with ether affords androsta-1,4-diene-3,11,17-trione 17-ethylene ketal, melting at about 213–215°.

A solution of 5 parts of androsta-1,4-diene-3,11,17-trione 17-ethylene ketal and 10 parts of lithium tri-(tertiary-butoxy) aluminum hydride in 180 parts of tetrahydrofuran is stirred at room temperature for about 18 hours. At the end of that reaction period, there is added successively 180 parts of tetrahydrofuran, 70 parts of ether, one part of water, one part of 20% aqueous sodium hydroxide and 5 parts of water. After standing at room temperature for about 10 minutes, the precipitated solids are removed by filtration and washed on the filter with chloroform. The resulting filtrate is dried over anhydrous magnesium sulfate, then is concentrated to dryness under reduced pressure. Trituration of that residue with ether affords colorless crystals of 11β-hydroxyandrosta-1,4-diene-3,17-dione 17-ethylene ketal, melting at about 175–185°.

To a mixture of approximately 42 parts of a 30% dispersion of lithium in paraffin, 125 parts of biphenyl, approximately 69 parts of diphenylmethane, and 1080 parts of tetrahydrofuran is added, with vigorous stirring at the reflux temperature over a period of about 30 minutes, a hot solution of 100 parts of 11β-hydroxy-androsta-1,4-diene-3,17-dione 17-ethylene ketal in 756 parts of tetrahydrofuran. Heating at the reflux temperature is continued for about 10 minutes, after which time 28 parts of methanol and 80 parts of water are successively added. After the addition of 400 parts more of water, the tetrahydrofuran is distilled under reduced pressure. The resulting residual mixture is cooled to room temperature, then is diluted with approximately 700 parts of a 3:1 mixture of benzene and hexane. The layers are separated and the organic solution is washed several times with 5% aqueous potassium hydroxide. Those washings are combined with the aqueous layer, and the resulting solution is washed with hexane and is slowly added, with vigorous stirring, to a mixture of 200 parts of acetic acid, 200 parts of water and 200 parts of ice, during which time the temperature is maintained below 10°. The resulting solid precipitate is isolated by filtration, then is washed with water and dried under reduced pressure to yield 3,11β-dihydroxyestra-1,3,5(10)-trien-17-one 17-ethylene ketal which, after recrystallization from acetone-pentane, melts at about 186–191°.

A mixture containing 4 parts of 3,11β-dihydroxy-estra-1,3,5(10)-trien-17-one 17-ethylene ketal, 22.8 parts of methyl iodide, 10 parts of potassium carbonate and 80 parts of methanol is heated at the reflux temperature with stirring. After approximately 30 minutes has elapsed, an additional 11.4 parts of methyl iodide is added and reflux and stirring are continued. Additional 11.4 part portions of methyl iodide are added after 90 minutes and again after 150 minutes of reaction time. After a total reaction time of 3 hours has elapsed, the mixture is diluted with water, then is stripped of solvent by distillation under reduced pressure. The crystalline crude product which separates is collected by filtration, washed on the filter with water, then dried to afford 11β-hydroxy-3-methoxyestra-1,3,5(10)-trien-17-one 17-ethylene ketal, melting at about 124–126°, and characterized further by infrared absorption maxima at about 2.86, 6.21 and 6.33 microns.

*Example 2*

To a solution of 1.62 parts of 11β-hydroxy-3-methoxyestra-1,3,5(10)-trien-17-one 17-ethylene ketal in 100 parts of acetone is added, at 5–10° over a period of about 2 minutes with vigorous stirring, 1.3 parts of an aqueous solution, 8 N in chromium trioxide and 8 N in sulfuric acid. The excess reagent is then destroyed by the addition of a small quantity of isopropyl alcohol, and the resulting mixture is filtered through diatomaceous earth, then stirred with approximately 100 parts by volume of saturated sodium bicarbonate. The organic solvent is removed by distillation under reduced pressure, and the residual mixture is extracted thoroughly with chloroform. The chloroform extracts are combined, dried over anhydrous magnesium sulfate and concentrated to dryness, thus producing 3-methoxyestra-1,3,5(10)-triene-11,17-dione 17-ethylene ketal, characterized by an infrared absorption maximum at about 5.84 microns.

To a solution of 1.55 parts of 3-methoxyestra-1,3,5-(10)-triene-11,17-dione 17-ethylene ketal in 45 parts of tetrahydrofuran is added, at room temperature with stirring, 15 parts by volume of 3 M methyl magnesium bromide in n-butyl ether. The resulting reaction mixture is stirred for about 3½ hours, then is diluted carefully with approximately 8 parts of methanol. Dilution of that mixture with 150 parts by volume of saturated aqueous sodium potassium tartarate followed by extraction with chloroform of the resulting mixture affords an organic solution. The aqueous layer is extracted with chloroform, and the chloroform solutions are combined, then dried over anhydrous magnesium sulfate and distilled to dryness under reduced pressure. The resulting 11-hydroxy - 3-methoxy-11-methylestra-1,3,5(10)-trien-17-one 17-ethylene ketal is characterized by an infrared absorption maximum, in chloroform, at about 2.76 microns.

To a solution of 1.35 parts of 11-hydroxy-3-methoxy-11-methylestra-1,3,5(10)-trien-17-one 17-ethylene ketal in 12 parts of pyridine is added, at −15° with stirring, one part of thionyl chloride. The resulting reaction mixture is stirred at that temperature for about 10 minutes, then is allowed to warm to approximately 0°. Approximately 50 parts of ice is then added in order to decompose the excess reagent, following which time 100 parts by volume of 4 N hydrochloric acid and approximately 150 parts of chloroform are successively added with stirring. Stirring is continued for about 10 minutes, following which time the layers are separated and the aqueous solution is washed with a fresh portion of chloroform. The chloroform extracts are then combined, washed successively with water and aqueous sodium bicarbonate, dried over anhydrous magnesium sulfate and stripped of solvent under reduced pressure. The resulting oily product is 3-methoxy-11-methylestra-1,3,5(10)-9(11) - tetraen - 17-one 17-ethylene ketal, which is characterized by infrared absorption maxima, in chloroform, at about 6.21 and 6.38 microns and also by nuclear magnetic resonance peaks, in chloroform, at about 115, 55, 227 and 236 cycles per second.

To a warm solution of 1.3 parts of 3-methoxy-11-methylestra-1,3,5(10),9(11)-tetraen-17-one 17-ethylene ketal in approximately 24 parts of methanol, water is added until the solution is just cloudy. That solution is clarified by the addition of a minimum quantity of methyl alcohol, following which time 1.5 parts by volume of 4 N hydrochloric acid is added. The resulting reaction mixture is heated on the steam bath for about 40 minutes, then is concentrated to dryness under reduced pressure. The residual material is extracted with chloroform, and the chloroform layer is separated, washed with saturated aqueous sodium bicarbonate, dried over anhydrous magnesium sulfate and distilled to dryness under reduced pressure. The resulting oily crude product is purified by adsorption on a silica gel chromatographic column followed by elution with 2% ethyl acetate in benzene. That eluted fraction is further purified by trituration with ether and hexane to afford 3-methoxy-11-methylestra-1,3,5(10)-9(11)-tetraen-17-one, melting at about 88°, and characterized also by infrared absorption maxima at about 5.72, 6.21 and 6.35 microns and by nuclear magnetic resonance peaks at about 227, 115 and 55 cycles per second. This compound exhibits an optical rotation, in chloroform, of +38.5°.

*Example 3*

To a solution of 5 parts of 3-methoxy-11-methylestra-1,3,5(10),9(11)-tetraen-17-one in 200 parts of methanol is added 0.5 part of 10% palladium-on-carbon catalyst, and that mixture is shaken with hydrogen at atmospheric pressure and room temperature until one molecular equivalent of hydrogen is absorbed. The reaction mixture is then filtered in order to remove the catalyst, and the filtrate is concentrated to a small volume by distillation under reduced pressure. The crystalline material which separates is collected by filtration and dried to afford 3-methoxy-11β-methylestra-1,3,5(10)-trien-17-one, melting at about 150°, and characterized further by ultraviolet absorption maxima at about 279–280 and 288 millimicrons with molecular extinction coefficients of about 2,055 and 1,940, respectively. It exhibits also nuclear magnetic resonance peaks at about 50, 57, 61 and 224 cycles per second.

Additional crystalline material obtained from the concentrated solution is isolated by filtration and dried to afford the crude product melting at about 105–115°. This material is purified further by chromatography on silica gel followed by elution with one percent ethyl acetate in benzene and recrystallization of the resulting fraction from ether and hexane to afford 3-methoxy-11α-methyl-9β-estra-1,3,5(10)-trien-17-one, melting at about 126–127°. This substance is further characterized by nuclear magnetic resonance maxima at about 61, 75, 83 and 227 cycles per second.

*Example 4*

To a refluxing mixture of 30 parts of 47% hydriodic acid with 70 parts of acetic anhydride is added, with stirring, one part of 3-methoxy-11β-methylestra-1,3,5(10)-trien-17-one and refluxing is continued for about 4 minutes. The reaction mixture is then cooled rapidly in an ice bath and added dropwise, with vigorous stirring, to a mixture of ice and water. The precipitated crude product is collected by filtration and dried. Purification is effected by stirring with a mixture of 5% aqueous potassium hydroxide and ether. The alkaline layer is separated and acidified by the addition of hydrochloric acid and the precipitate which forms is collected by filtration, washed on the filter with water and dried to produce 3-hydroxy-11β-methylestra-1,3,5(10)-trien-17-one, melting at about 275–280°. This compound exhibits, in a potassium bromide disc, infrared absorption maxima at about 3.03, 3.42, 5.80, 6.18 and 6.32 microns.

*Example 5*

A mixture of 4 parts of 3-methoxy-11β-methylestra-1,3,5(10)-trien-17-one, 10 parts of a 30% lithium acetylide-70% ethylene diamine complex and 225 parts of tetrahydrofuran is stirred in a nitrogen atmosphere at 0–5° for about 2½ hours, then is diluted carefully with water. The resulting solution is concentrated to a small volume under nitrogen and the residual mixture is extracted with benzene. The benzene layer is dried over anhydrous magnesium sulfate, then distilled to dryness under reduced pressure. Trituration of the resulting residue with ether and hexane followed by recrystallization from acetone-hexane affords 17α-ethynyl-3-methoxy-11β-methylestra-1,3,5(10)-trien-17β-ol, melting at about 169–171°. This compound exhibits infrared absorption maxima at about 2.87 and 3.07 microns and is characterized further by the following structural formula

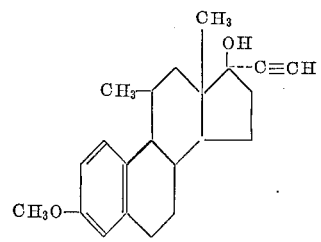

*Example 6*

A mixture of 2.5 parts of 17α-ethynyl-3-methoxy-11β-methylestra-1,3,5(10)-trien-17β-ol, 50 parts of acetic anhydride and 50 parts of pyridine is heated at 90–100° for about 18 hours, then is concentrated to dryness under reduced pressure. The resulting crude crystalline product is thoroughly dried to afford 17α-ethynyl-3-methoxy-11β-methylestra-1,3,5(10) - trien-17β-ol 17-acetate, characterized by infrared absorption maxima, in chloroform, at about 3.01, 5.73 and 6.21 microns, and also by nuclear magnetic resonance peaks at about 51, 58, 62, 123, 159 and 227 cycles per second. This compound is represented by the following structural formula

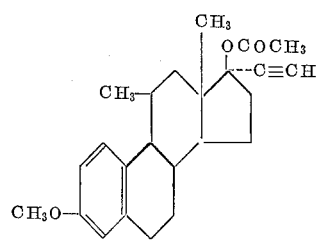

*Example 7*

A mixture containing 5.4 parts of 17α-ethynyl-3-methoxy-11β-methylestra-1,3,5(10)-trien-17β-ol, 2 parts of 5% palladium-on-carbon catalyst and 1000 parts of pyridine is shaken with hydrogen at atmospheric pressure and room temperature until one molecular equivalent of hydrogen has been absorbed. Removal of the catalyst by filtration affords an organic solution which is evaporated to dryness, thus producing 3-methoxy-11β-methyl- 17α-vinylestra-1,3,5(10)-trien-17β-ol. This compound is represented by the following structural formula

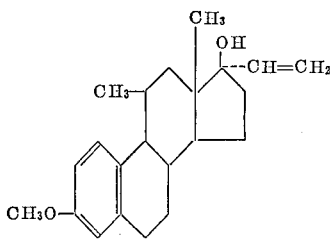

Example 8

To a solution of 4.5 parts of dl-13β-ethyl-3-methoxy-gona-1,3,5(10),9(11)-tetraen-17β-ol in 300 parts of chloroform is added, with stirring, a solution of 3 parts of m-chloroperbenzoic acid in 75 parts of chloroform. The resulting reaction mixture is stirred for about 45 minutes, then is diluted with approximately 200 parts by volume of an aqueous solution containing 15 parts of sodium sulfite. Stirring is continued for about 10 minutes following which time the chloroform layer is separated, dried over anhydrous magnesium sulfate and distilled to dryness under reduced pressure. The resulting amorphous solid crude product is purified by adsorption on a silica gel chromatographic column followed by elution with 20% ethyl acetate in benzene, thus producing dl-13β - ethyl - 17β - hydroxy - 3 - methoxygona - 1,3,5(10)-trien-11-one, which is characterized by ultraviolet absorption maxima at about 275 and 280 millimicrons and also by infrared absorption maxima at about 2.76 and 5.82 microns.

To a solution of 3 parts of dl-13β-ethyl-17β-hydroxy-3-methoxygona-1,3,5(10)-trien-11-one in 44 parts of benzene is added 50 parts by volume of a 1.7 M methyl lithium in ether solution. After the addition is complete the resulting mixture is concentrated to approximately ½ volume by distillation then is heated at the reflux temperature for about 4 hours. Cooling of the mixture followed by the dropwise addition of aqueous ammonium chloride until cessation of the evolution of gas affords a mixture which is further diluted by the addition of 100 parts by volume of aqueous ammonium chloride. That mixture is then stirred with ether, and the ether layer is separated, dried over anhydrous magnesium sulfate and concentrated to dryness under reduced pressure to afford 13β-ethyl-3-methoxy-11-methylgona-1,3,5(10)-triene-11,17β-diol, exhibiting infrared absorption maxima, in chloroform, at about 2.75 and 2.88 microns.

To a solution of one part of dl-13β-ethyl-3-methoxy-11 methylgona-1,3,5(10)-triene-11,17β-diol in 40 parts of acetone is added one part by volume of an aqueous solution, 8 N in chromium trioxide and 8 N in sulfuric acid, and that mixture is stirred for about 3 minutes. A small quantity of isopropyl alcohol is added in order to destroy the excess oxidant, and the resulting mixture is concentrated to a small volume, then diluted with water and neutralized by the addition of saturated aqueous sodium bicarbonate. Extraction of that neutralized mixture with ether affords a solution, which is dried over anhydrous magnesium sulfate and distilled to dryness to afford a residual oil consisting of a mixture of dl - 13β - ethyl - 3 - methoxy - 11 - methyl - 11 - hydroxygona-1,3,5(10)-trien-17-one and dl - 13β - ethyl - 3-methoxy-11-methylgona-1,3,5(10),9(11)-tetraen-17-one.

The latter mixture is dissolved in 5 parts of pyridine, then is cooled in an ice bath while 0.8 part of thionyl chloride is added dropwise with stirring. The resulting reaction mixture is allowed to stand for approximately one minute, then is diluted with ice and water. Acidification of the mixture with dilute hydrochloric acid followed by extraction with ether affords an organic layer, which is washed with aqueous sodium bicarbonate, dried over anhydrous magnesium sulfate and distilled to dryness under reduced pressure, thus affording dl-13β-ethyl-3-methoxy-11-methylgona-1,3,5(10),9(11)-tetraen-17-one.

Example 9

When an equivalent quantity of dl - 13β - ethyl - 3-methoxy-11-methylgona-1,3,5(10),9(11)-tetraen-17 - one is hydrogenated by the procedure of Example 3, there is obtained dl-13β-ethyl-3-methoxy-11β-methylgona-1,3,5-(10)-trien-17-one.

Example 10

The ethynylation of an equivalent quantity of dl-13β-ethyl-3-methoxy-11β-methylgona - 1,3,5(10)-trien-17-one according to the procedure described in Example 5 results in dl-13β-ethyl-17α-ethynyl-3-methoxy-11β-methylgona-1,3,5(10)-trien-17β-ol.

Example 11

When an equivalent quantity of 3-hydroxy-11β-methylestra-1,3,5(10)-trien-17-one is substituted in the procedure of Example 5, there is produced 17α-ethynyl-11β-methylestra-1,3,5(10)-triene-3,17β-diol.

Example 12

The substitution of an equivalent quantity of 17α-ethynyl - 11β - methylestra - 1,3,5(10) - triene - 3,17β-diol in the procedure of Example 6, results in 17α-ethynyl-11β - methylestra - 1,3,5(10) - triene - 3,17β - diol 3,17-diacetate.

Example 13

When an equivalent quantity of 17α-ethynyl-11β-methylestra-1,3,5(10)-triene-3,17β-diol is substituted in the procedure of Example 6, with the modification that the procedure is carried out at room temperature rather than at 90–100°, there is produced 17α-ethynyl-11β-methylestra-1,3,5(10)-triene-3,17β-diol 3-acetate.

Example 14

The substitution of an equivalent quantity of 3-methoxyestra-1,3,5(10)-triene-11,17-dione 17 - ethylene ketal in the procedure of Example 5 results in 11-ethynyl-11-hydroxy-3-methoxyestra-1,3,5(10)-trien - 17 - one 17-ethylene ketal.

To a solution of 3.68 parts of 11-ethynyl-11-hydroxy-3-methoxyestra-1,3,5(10)-trien-17-one 17-ethylene ketal in 400 parts of methanol is added 0.5 part of 5% palladium-on-carbon catalyst, and the resulting mixture is shaken with hydrogen at room temperature and atmospheric pressure until two molecular equivalents of hydrogen have been absorbed. Removal of the catalyst by filtration affords an organic solution which is concentrated to dryness under reduced pressure, thus affording 11-ethyl - 11 - hydroxy - 3 - methoxyestra - 1,3,5(10) - trien-17-one 17-ethylene ketal.

The dehydration with thionyl chloride of 11-ethyl-11-hydroxy - 3 - methoxyestra-1,3,5(10)-trien - 17 - one 17-ethylene ketal according to the procedure described in Example 2 results in 11-ethyl-3-methoxyestra-1,3,5(10), 9(11)-tetraen-17-one 17-ethylene ketal.

The hydrolysis of an equivalent quantity of 11-ethyl-3-methoxyestra-1,3,5(10),9(11)-tetraen-17-one 17-ethylene ketal by the procedure described in Example 2 results in 11-ethyl - 3 - methoxyestra-1,3,5(10),9(11)-tetraen-17-one.

When an equivalent quantity of 11-ethyl-3-methoxyestra-1,3,5(10),9(11)-tetraen-17-one is hydrogenated by the procedure of Example 3, there is produced 11β-ethyl-3-methoxyestra-1,3,5(10)-trien-17-one.

When an equivalent quantity of 11β-ethyl-3-methoxyestra-1,3,5(10)-trien-17-one is substituted in the procedure of Example 5, there is produced 11β-ethyl17α-ethynylestra-1,3,5(10)-triene-3,17β-diol 3-methyl ether.

Example 15

When 3,11β-dihydroxyestra-1,3,5(10)-trien-17-one 17-ethylene ketal is allowed to react with an equivalent quantity of ethyl iodide by the procedure described in Example 1, there is produced 3-ethoxy-11β-hydroxyestra-1,3,5(10)-trien-17-one 17-ethylene ketal.

When an equivalent quantity of 3-ethoxy-11β-hydroxyestra-1,3,5(10)-trien - 17 - one 17-ethylene ketal is subjected to the successive processes described in Example 2, there is obtained 3-ethoxy-11-methylestra-1,3,5(10), 9(11)-tetraen-17-one.

The substitution of an equivalent quantity of 3-ethoxy-11-methylestra-1,3,5(10),9(11)-tetraen-17-one in the procedure described in Example 3 results in 3-ethoxy-11β-methylestra-1,3,5(10)-trien-17-one.

When equivalent quantities of 3-ethoxy-11β-methylestra-1,3,5(10)-trien - 17 - one and a lithium propynylide-ethylene diamine complex are allowed to react by the procedure described in Example 5, there is produced 3-ethoxy-11β-methyl - 17α - pyropynylestra-1,3,5(10)-trien-17β-ol.

Example 16

When equivalent quantities of 17α-ethynyl-11β-methylestra-1,3,5(10)-triene-3,17β-diol and propionic anhydride are substituted in the procedure of Example 6, there is obtained 17α-ethynyl - 11β - methylestra-1,3,5(10)-triene-3,17β-diol 3,17-dipropionate.

Example 17

The partial reduction of an equivalent quantity of 3-ethoxy-11β-methyl - 17α - propynylestra-1,3,5(10)-trien-17β-ol by the procedure described in Example 7 results in 3-ethoxy-11β-methyl - 17α - propenylestra-1,3,5(10)-trien-17β-ol.

What is claimed is:

1. A compound of the formula

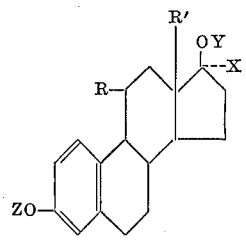

wherein R and R' are lower alkyl radicals, X is an unsaturated lower aliphatic hydrocarbon radical, Y is selected from the group consisting of hydrogen and a lower alkanoyl radical and Z is selected from the group consisting of hydrogen, lower alkyl and lower alkanoyl radicals.

2. A compound of the formula

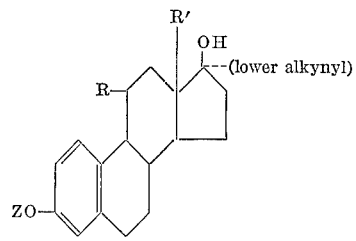

wherein R, R' and Z are lower alkyl radicals.

3. A compound of the formula

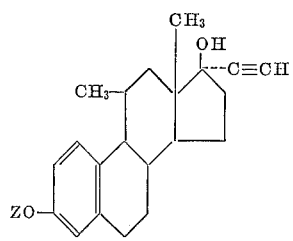

wherein Z is selected from the group consisting of hydrogen, lower alkyl and lower alkanoyl radicals.

4. 17α-ethynyl - 11β - methylestra-1,3,5(10)-triene-3,17β-diol 3-methyl ether.

5. 17α-ethynyl - 3 - methoxy - 11β - methylestra-1,3,5-(10)-trien-17β-ol 17-acetate.

6. 11β-methyl - 17α - vinylestra-1,3,5(10)-triene-3,17β-diol 3-methyl ether.

7. 17α-ethynyl - 11β - methylestra-1,3,5(10)-triene-3, 17β-diol.

8. 17α-ethynyl - 11β - methylestra-1,3,5(10)-triene-3, 17β-diol 3-acetate.

References Cited by the Examiner

UNITED STATES PATENTS 2,666,769  1/1954  Colton _____ 260—397.4

LEWIS GOTTS, *Primary Examiner.*

T. M. MESHBESHER, *Assistant Examiner.*